United States Patent
Zhou et al.

(10) Patent No.: US 11,751,205 B2
(45) Date of Patent: Sep. 5, 2023

(54) BEAM INDICATION FOR SEMI-PERSISTENT TRANSMISSIONS

(71) Applicant: QUALCOMM Incorporated, San Diego, CA (US)

(72) Inventors: Yan Zhou, San Diego, CA (US); Tao Luo, San Diego, CA (US); Sony Akkarakaran, Poway, CA (US); Wooseok Nam, San Diego, CA (US); Xiaoxia Zhang, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 16/837,803

(22) Filed: Apr. 1, 2020

(65) Prior Publication Data

US 2020/0322930 A1 Oct. 8, 2020

Related U.S. Application Data

(60) Provisional application No. 62/829,605, filed on Apr. 4, 2019.

(51) Int. Cl.
*H04W 72/00* (2023.01)
*H04W 72/23* (2023.01)
*H04W 72/21* (2023.01)

(52) U.S. Cl.
CPC .......... *H04W 72/23* (2023.01); *H04W 72/21* (2023.01)

(58) Field of Classification Search
CPC .............. H04B 7/0695; H04W 72/046; H04W 72/042; H04L 5/0053; H04L 5/0094
See application file for complete search history.

(56) References Cited

U.S. PATENT DOCUMENTS

| | | | |
|---|---|---|---|
| 7,287,096 B2* | 10/2007 | Wunsch | H04L 5/1453 709/248 |
| 2018/0332606 A1 | 11/2018 | Lee et al. | |
| 2019/0306924 A1* | 10/2019 | Zhang | H04W 72/046 |
| 2019/0320469 A1* | 10/2019 | Huang | H04L 5/0053 |
| 2020/0022144 A1* | 1/2020 | Papasakellariou | H04W 72/0413 |
| 2020/0288479 A1 | 9/2020 | Xi et al. | |

(Continued)

FOREIGN PATENT DOCUMENTS

| | | |
|---|---|---|
| WO | 2017172479 A1 | 10/2017 |
| WO | 2018217063 A1 | 11/2018 |
| WO | 2019032882 A1 | 2/2019 |

OTHER PUBLICATIONS

Partial International Search Report—PCT/US2020/026400—ISAEPO—dated Jun. 26, 2020.

(Continued)

*Primary Examiner* — Bo Hui A Zhu
(74) *Attorney, Agent, or Firm* — Harrity & Harrity, LLP

(57) ABSTRACT

Various aspects of the present disclosure generally relate to wireless communication. In some aspects, a user equipment (UE) may receive information identifying a virtual control resource set (CORESET) or a virtual search space for a semi-persistently scheduled shared channel. The UE may receive the semi-persistently scheduled shared channel using a default beam that is selected based at least in part on the virtual CORESET or the virtual search space. Numerous other aspects are provided.

30 Claims, 11 Drawing Sheets

(56) References Cited

U.S. PATENT DOCUMENTS

2020/0296635 A1* 9/2020 Rastegardoost .. H04W 36/0077
2020/0314664 A1* 10/2020 Zhou ...................... H04B 7/088

OTHER PUBLICATIONS

QUALCOMM Incorporated: "Remaining Details on QCL", 3GPP Draft, 3GPP TSG-RAN WG1 Meeting #93, R1-1807351, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 20, 2018 (May 20, 2018), XP051442543, pp. 1-10 Retrieved from the Internet: URL: http://www.3gpp.org/ftp/Meetings%5F3GPP%5FSYNC/RAN1/Docs/, [retrieved on May 20, 2018], Section 2.2, p. 3.

CATT: "Discussion on UL Beam Management", 3GPP TSG RAN WG1 Meeting #89, 3GPP Draft; R1-1707476, 3rd Generation Partnership Project (3GPP), Mobile Competence Centre ; 650, Route Des Lucioles; F-06921 Sophia-Antipolis Cedex; France, vol. RAN WG1, No. Hangzhou; May 15, 2017-May 19, 2017 May 14, 2017, (May 14. 2017), 3 Pages, XP051272684, Retrieved from the Internet: URL: http://www.3gpp.org/ftp/Meetings_3GPP_SYNC/RAN1/Docs/ [retrieved on May 14, 2017].

International Search Report and Written Opinion—PCT/US2020/026400—ISA/EPO—dated Sep. 14, 2020.

* cited by examiner

BEAM INDICATION FOR SEMI-PERSISTENT TRANSMISSIONS

CROSS-REFERENCE TO RELATED APPLICATION

This Patent Application claims priority to Provisional Patent Application No. 62/829,605, filed on Apr. 4, 2019, entitled "BEAM INDICATION FOR SEMI-PERSISTENT TRANSMISSIONS," and assigned to the assignee hereof. The disclosure of the prior Application is considered part of and is incorporated by reference in this Patent Application.

FIELD OF THE DISCLOSURE

Aspects of the present disclosure generally relate to wireless communication, and to techniques and apparatuses for beam indication for semi-persistent transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a user equipment (UE) for wireless communication may include memory and one or more processors operatively coupled to the memory. The memory and the one or more processors may be configured to receive control information indicating a first beam configuration that overrides a second beam configuration of a first occasion of a semi-persistent scheduling (SPS) communication; and perform one or more subsequent occasions of the SPS communication, after the first occasion of the SPS communication, using the first beam configuration.

In some aspects, a UE for wireless communication may include memory and one or more processors operatively coupled to the memory. The memory and the one or more processors may be configured to receive reconfiguration information for an SPS parameter, wherein the reconfiguration information is based at least in part on a time parameter associated with completion of a reconfiguration of the SPS parameter; and reconfigure an SPS communication based at least in part on the reconfiguration information and in accordance with the time parameter.

In some aspects, a method of wireless communication, performed by a UE, may include receiving information identifying a virtual control resource set (CORESET) or a virtual search space for a semi-persistently shared channel, wherein the information is communicated using a media access control (MAC) control element (CE) or downlink control information (DCI); and receiving the semi-persistently scheduled shared channel using a default beam that is selected based at least in part on the virtual CORESET or the virtual search space.

In some aspects, a method of wireless communication, performed by a UE, may include receiving control information indicating a first beam configuration that overrides a second beam configuration of a first occasion of an SPS communication; and performing one or more subsequent occasions of the SPS communication, after the first occasion of the SPS communication, using the first beam configuration.

In some aspects, a method of wireless communication, performed by a UE, may include receiving reconfiguration information for an SPS parameter, wherein the reconfiguration information is based at least in part on a time parameter associated with completion of a reconfiguration of the SPS parameter; and reconfiguring an SPS communication based at least in part on the reconfiguration information and in accordance with the time parameter.

In some aspects, a UE for wireless communication may include memory and one or more processors operatively coupled to the memory. The memory and the one or more processors may be configured to receive information identifying a virtual CORESET or a virtual search space for a semi-persistently scheduled shared channel, wherein the information is communicated using a MAC CE or DCI; and receive the semi-persistently scheduled shared channel using a default beam that is selected based at least in part on the virtual CORESET or the virtual search space.

In some aspects, a method of wireless communication, performed by a base station, may include transmitting control information indicating a first beam configuration that overrides a second beam configuration of a first occasion of an SPS communication; and performing one or more subsequent occasions of the SPS communication, after the first occasion of the SPS communication, using the first beam configuration.

In some aspects, a base station for wireless communication may include memory and one or more processors operatively coupled to the memory. The memory and the one or more processors may be configured to transmit information identifying a virtual CORESET or a virtual search space for a semi-persistently scheduled shared channel, wherein the information is communicated using a MAC CE or DCI; and transmit the semi-persistently scheduled shared channel based at least in part on a default beam that is selected based at least in part on the virtual CORESET or the virtual search space.

In some aspects, an apparatus for wireless communication may include means for receiving information indicating a time parameter associated with completion of a reconfiguration of an SPS parameter; and means for transmitting reconfiguration information for an SPS communication, wherein the reconfiguration information is determined or transmitted based at least in part on the time parameter.

In some aspects, a base station for wireless communication may include memory and one or more processors operatively coupled to the memory. The memory and the one or more processors may be configured to transmit control information indicating a first beam configuration that overrides a second beam configuration of a first occasion of an SPS communication; and perform one or more subsequent occasions of the SPS communication, after the first occasion of the SPS communication, using the first beam configuration.

In some aspects, a method of wireless communication, performed by a base station, may include receiving information indicating a time parameter associated with completion of a reconfiguration of an SPS parameter; and transmitting reconfiguration information for an SPS communication, wherein the reconfiguration information is determined or transmitted based at least in part on the time parameter.

In some aspects, a base station for wireless communication may include memory and one or more processors operatively coupled to the memory. The memory and the one or more processors may be configured to receive information indicating a time parameter associated with completion of a reconfiguration of an SPS parameter; and transmit reconfiguration information for an SPS communication, wherein the reconfiguration information is determined or transmitted based at least in part on the time parameter.

In some aspects, a method of wireless communication, performed by a base station, may include transmitting information identifying a virtual CORESET or a virtual search space for a semi-persistently scheduled shared channel, wherein the information is communicated using a MAC CE or DCI; and transmitting the semi-persistently scheduled shared channel based at least in part on a default beam that is selected based at least in part on the virtual CORESET or the virtual search space.

In some aspects, a non-transitory computer-readable medium may store one or more instructions for wireless communication. The one or more instructions, when executed by one or more processors of a base station, may cause the one or more processors to: transmit information identifying a virtual CORESET or a virtual search space for a semi-persistently scheduled shared channel, wherein the information is communicated using a MAC CE or DCI; and transmit the semi-persistently scheduled shared channel based at least in part on a default beam that is selected based at least in part on the virtual CORESET or the virtual search space.

In some aspects, a non-transitory computer-readable medium may store one or more instructions for wireless communication. The one or more instructions, when executed by one or more processors of a base station, may cause the one or more processors to: receive control information indicating a first beam configuration that overrides a second beam configuration of a first occasion of an SPS communication; and perform one or more subsequent occasions of the SPS communication, after the first occasion of the SPS communication, using the first beam configuration.

In some aspects, a non-transitory computer-readable medium may store one or more instructions for wireless communication. The one or more instructions, when executed by one or more processors of a base station, may cause the one or more processors to: transmit control information indicating a first beam configuration that overrides a second beam configuration of a first occasion of an SPS communication; and perform one or more subsequent occasions of the SPS communication, after the first occasion of the SPS communication, using the first beam configuration.

In some aspects, a non-transitory computer-readable medium may store one or more instructions for wireless communication. The one or more instructions, when executed by one or more processors of a base station, may cause the one or more processors to: receive reconfiguration information for an SPS parameter, wherein the reconfiguration information is based at least in part on a time parameter associated with completion of a reconfiguration of the SPS parameter; and reconfigure an SPS communication based at least in part on the reconfiguration information and in accordance with the time parameter.

In some aspects, a non-transitory computer-readable medium may store one or more instructions for wireless communication. The one or more instructions, when executed by one or more processors of a base station, may cause the one or more processors to: receive information indicating a time parameter associated with completion of a reconfiguration of an SPS parameter; and transmit reconfiguration information for an SPS communication, wherein the reconfiguration information is determined or transmitted based at least in part on the time parameter.

In some aspects, an apparatus for wireless communication may include means for receiving information identifying a virtual CORESET or a virtual search space for a semi-persistently scheduled shared channel, wherein the information is communicated using a MAC CE or DCI; and means for receiving the semi-persistently scheduled shared channel using a default beam that is selected based at least in part on the virtual CORESET or the virtual search space.

In some aspects, an apparatus for wireless communication may include means for transmitting information identifying a virtual CORESET or a virtual search space for a semi-persistently scheduled shared channel, wherein the information is communicated using a MAC CE or DCI; and means for transmitting the semi-persistently scheduled shared channel based at least in part on a default beam that is selected based at least in part on the virtual CORESET or the virtual search space.

In some aspects, an apparatus for wireless communication may include means for receiving control information indicating a first beam configuration that overrides a second beam configuration of a first occasion of an SPS communication; and means for performing one or more subsequent occasions of the SPS communication, after the first occasion of the SPS communication, using the first beam configuration.

In some aspects, an apparatus for wireless communication may include means for transmitting control information indicating a first beam configuration that overrides a second beam configuration of a first occasion of an SPS communication; and means for performing one or more subsequent occasions of the SPS communication, after the first occasion of the SPS communication, using the first beam configuration.

In some aspects, an apparatus for wireless communication may include means for receiving reconfiguration information for an SPS parameter, wherein the reconfiguration information is based at least in part on a time parameter associated with completion of a reconfiguration of the SPS parameter; and means for reconfiguring an SPS communication based at least in part on the reconfiguration information and in accordance with the time parameter.

In some aspects, a non-transitory computer-readable medium may store one or more instructions for wireless communication. The one or more instructions, when executed by one or more processors of a base station, may cause the one or more processors to: receive information identifying a virtual CORESET or a virtual search space for a semi-persistently scheduled shared channel, wherein the information is communicated using a MAC CE or DCI; and receive the semi-persistently scheduled shared channel using a default beam that is selected based at least in part on the virtual CORESET or the virtual search space.

Aspects generally include a method, apparatus, system, computer program product, non-transitory computer-readable medium, user equipment, base station, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
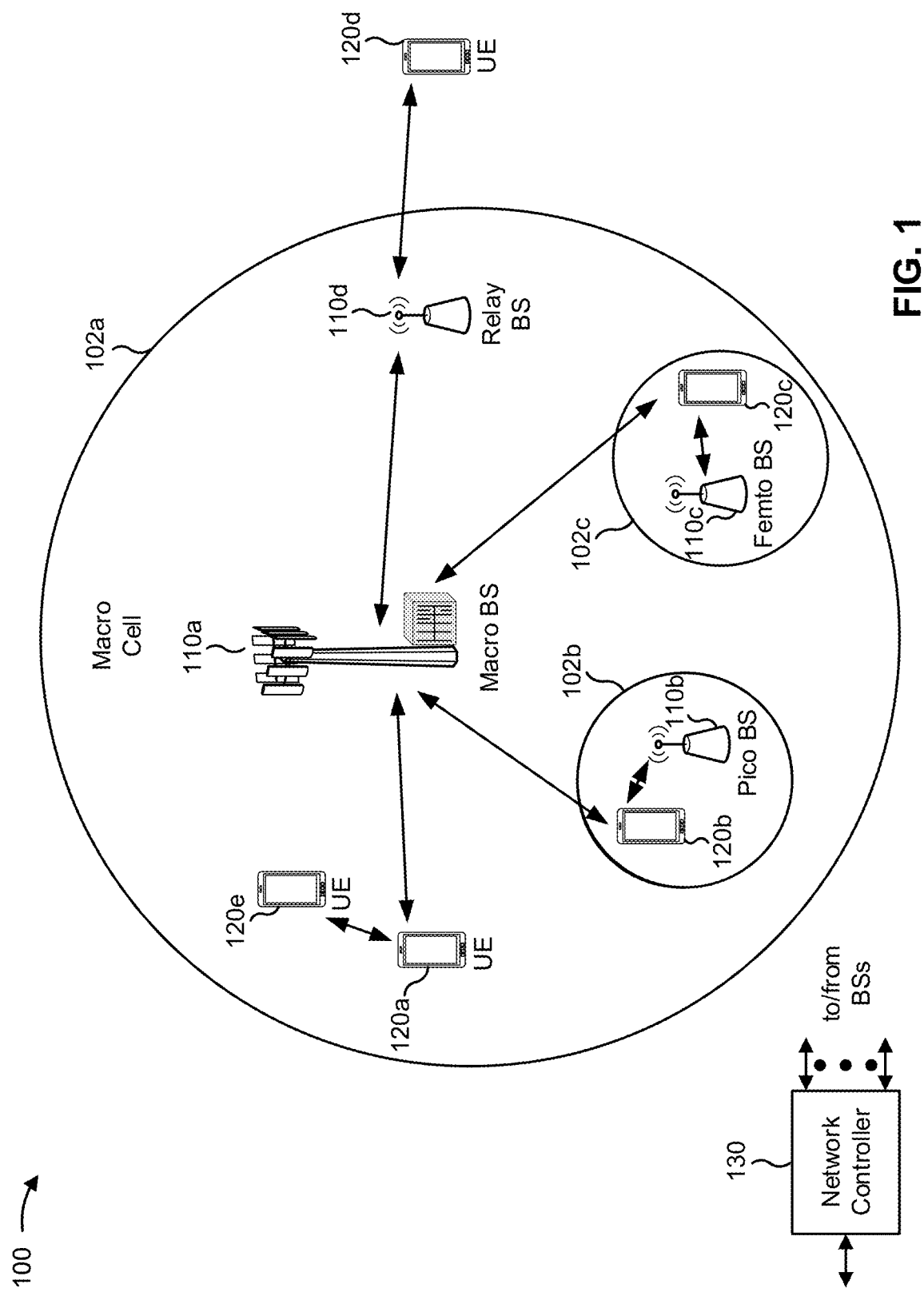
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced.

The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
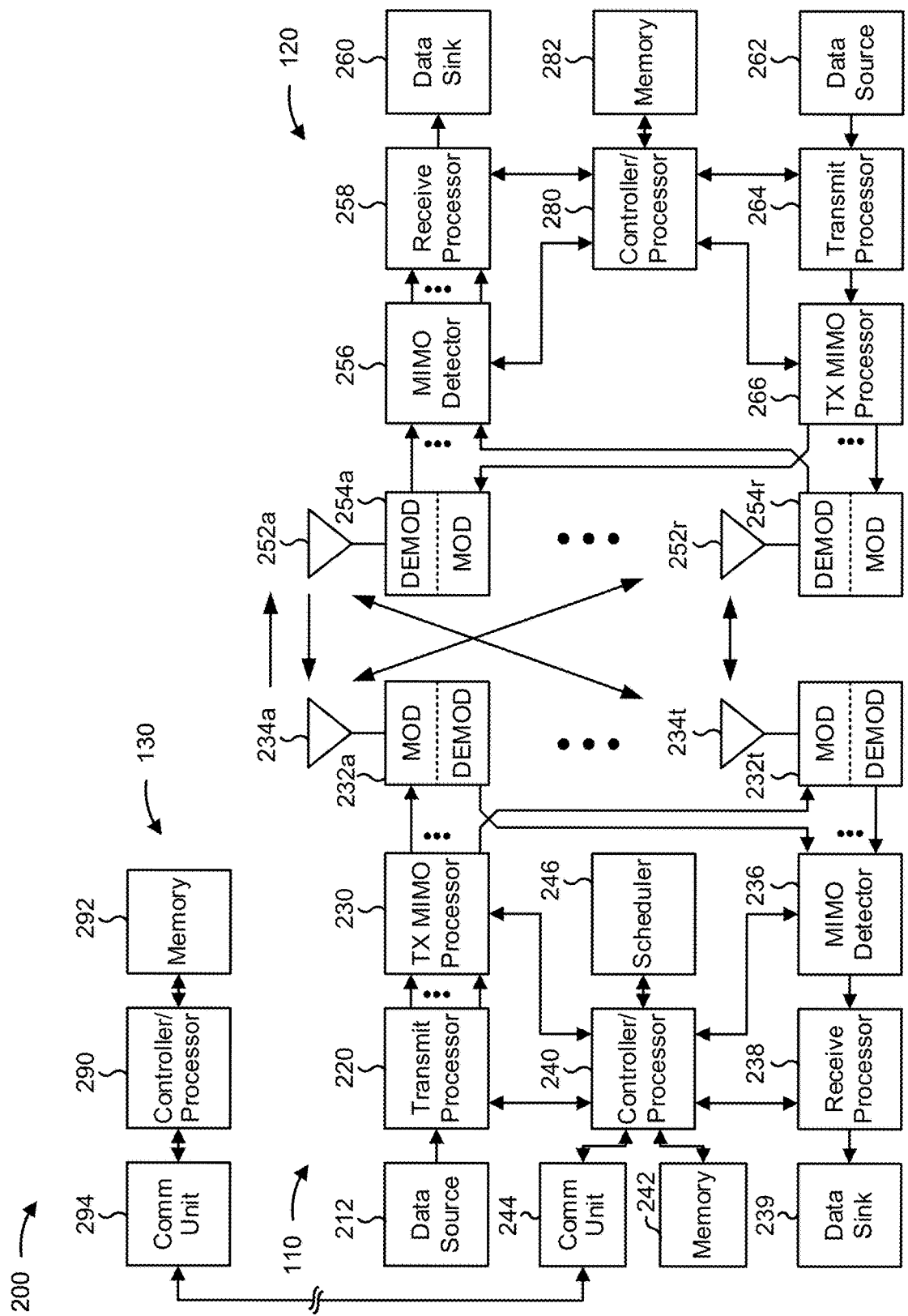
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with beam indication for semi-persistent scheduling transmissions, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, process 900 of FIG. 9, process 1000 of FIG. 10, process 1100 of FIG. 11, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving information identifying a virtual control resource set (CORESET) or a virtual search space for a semi-persistent scheduling (SPS) shared channel, wherein the information is communicated using a media access control (MAC) control element (CE) or downlink control information (DCI); means for receiving the semi-persistently scheduled shared channel using a default beam that is selected based at least in part on the virtual CORESET or the virtual search space; means for receiving control information indicating a first beam configuration that overrides a second beam configuration of a first occasion of an SPS communication; means for performing one or more subsequent occasions of the SPS communication, after the first occasion of the SPS communication, using the first beam configuration; means for receiving the one or more subsequent occasions of the SPS communication using the first beam configuration without receiving additional control information corresponding to the one or more subsequent occasions; means for receiving information that indicates that the first beam configuration is to be used for the one or more subsequent occasions or that indicates a parameter for using the first beam configuration for the one or more subsequent occasions; means for receiving reconfiguration information for an SPS parameter, wherein the reconfiguration information is based at least in part on a time parameter associated with completion of a reconfiguration of the SPS parameter; means for reconfiguring an SPS communication based at least in part on the reconfiguration information and in accordance with the time parameter; and/or the like. In some aspects, such means may include one or more components of UE 120 described in connection with FIG. 2.

In some aspects, base station 110 may include means for transmitting information identifying a virtual CORESET or a virtual search space for a semi-persistently scheduled shared channel, wherein the information is communicated using a MAC CE or DCI; means for transmitting the semi-persistently scheduled shared channel based at least in part on a default beam that is selected based at least in part on the virtual CORESET or the virtual search space; means for transmitting control information indicating a first beam configuration that overrides a second beam configuration of a first occasion of an SPS communication; means for performing one or more subsequent occasions of the SPS communication, after the first occasion of the SPS communication, using the first beam configuration; means for transmitting the one or more subsequent occasions of the SPS communication using the first beam configuration without receiving additional control information corresponding to the one or more subsequent occasions; means for transmitting information that indicates that the first beam configuration is to be used for the one or more subsequent occasions or that indicates a parameter for using the first beam configuration for the one or more subsequent occasions; means for receiving information indicating a time parameter associated with completion of a reconfiguration of an SPS parameter; means for transmitting reconfiguration information for an SPS communication, wherein the reconfiguration information is determined or transmitted based at least in part on the time parameter; means for receiving an acknowledgment (ACK) or a negative ACK (NACK) for the reconfiguration information; and/or the like. In some aspects, such means may include one or more components of base station 110 described in connection with FIG. 2.

As indicated above, FIG. 2 is provided as an example. Other examples may differ from what is described with regard to FIG. 2.

Semi-persistent scheduling (SPS) may provide for the scheduling of a periodic communication (e.g., an uplink communication or a downlink communication) for a UE. For example, a base station may provide configuration information identifying an SPS configuration, and the UE may transmit or receive a communication in accordance with the SPS configuration. SPS configurations, communications, shared channels, parameters, and so on can refer to the uplink, the downlink, or both. In other words, SPS, as used herein, is not limited to the concept of the downlink SPS communication.

In some aspects, a UE may determine a default beam for an SPS communication, such as a default beam for a physical downlink shared channel (PDSCH) of the SPS. The UE may determine the default beam based at least in part on a control resource set (CORESET) and/or a search space (SS) or search space set of the SPS. As one example, for a UE, multiple transmission configuration indication (TCI) states can be configured for a quasi-colocation (QCL) indication (e.g., including a spatial QCL parameter for beam indication). The UE may determine a beam for a transmission based at least in part on an indicated TCI state of the configured TCI states. For example, if a scheduling offset of the transmission fails to satisfy a threshold, the UE may use a beam based at least in part on a default TCI state, which may be used for PDCCH QCL indication of a lowest CORESET identifier in the latest slot in which one or more CORESETs are configured for the UE, and if the scheduling offset satisfies the threshold, the UE may use a beam indicated by the TCI field in the assignment DCI. However, for some PDSCH transmissions that are not associated with a scheduling physical downlink control channel (PDCCH), such as semi-persistently scheduled communications, the default beam from the most recent CORESET may be too outdated, particularly when the search space monitoring periodicity is large. On the other hand, configuring many search spaces with small periodicity for the purpose of default beam indication may introduce increased overhead.

To rectify this issue, a virtual search space or CORESET may be configured. The virtual search space or CORESET may be a type of search space or CORESET that is defined only for PDSCH QCL indication. For example, the virtual search space or CORESET may not include a PDCCH, and the UE may not perform blind decoding for the virtual search space or CORESET. However, when the UE uses the virtual search space or CORESET, the UE may incur significant latency if a default beam is to be configured or reconfigured during operation, since the radio resource control (RRC) information used to configure the virtual search space or CORESET may be associated with significant overhead.

In some aspects, a UE may receive control information that overrides an SPS configuration. For example, if a PDCCH schedules a PDSCH that at least partially overlaps with an SPS PDSCH, the beam of the SPS PDSCH may be overwritten by the beam used or indicated by the overriding PDCCH. This may be useful, for example, when the scheduling entity determines that an updated beam configuration may provide improved performance for reception of the SPS PDSCH. However, signaling the overriding PDCCH configuration for each occasion of an SPS PDSCH may cause significant signaling overhead, reducing efficiency of resource allocation.

In some aspects, a UE may receive information reconfiguring an SPS PDSCH TCI state. For example, this information may include a media access control (MAC) control element (CE), downlink control information (DCI), and/or the like. The information may indicate an updated TCI state for an SPS communication. However, the UE may not be capable of immediately implementing the updated TCI state (e.g., due to antenna limitations, radio frequency chain limitations, and/or the like). If a TCI state is indicated without sufficient time to implement the TCI state, reception performance of the corresponding PDSCH may suffer.

Some techniques and apparatuses described herein provide dynamic reconfiguration of virtual search spaces. For example, a virtual search space, and the corresponding virtual CORESETs (e.g., including the respective QCL parameters of the virtual CORESETs) may be indicated using lower-layer signaling than RRC, such as DCI or a medium access control control element (MAC-CE). Thus, latency associated with the reconfiguration of virtual search spaces and/or CORESETs may be reduced by using lower-layer signaling, thereby enabling improved performance of the UE with regard to an SPS communication. In some aspects, the above operations may be applied for a non-persistent communication (e.g., a dynamically scheduled communication, a one-off communication, and/or the like).

Some techniques and apparatuses described herein provide a persistent approach for an overwritten beam indication. For example, some techniques and apparatuses described herein may apply an overwritten beam indication to a first semi-persistently scheduled communication and to one or more subsequent semi-persistently scheduled communications, based at least in part on a configuration of the overwritten beam indication. Thus, air interface resources may be conserved and scheduling efficiency may be improved.

Some techniques and apparatuses described herein provide reconfiguration for an SPS communication based at least in part on a time parameter. For example, the time parameter may be based at least in part on a desired time gap receiving reconfiguration information and implementing the reconfiguration information, or based at least in part on one or more other gaps described herein. Thus, the UE may be provided with sufficient time to reconfigure a beam to transmit or receive an SPS communication, thereby improving transmission or reception performance of the UE.

Figure 3:
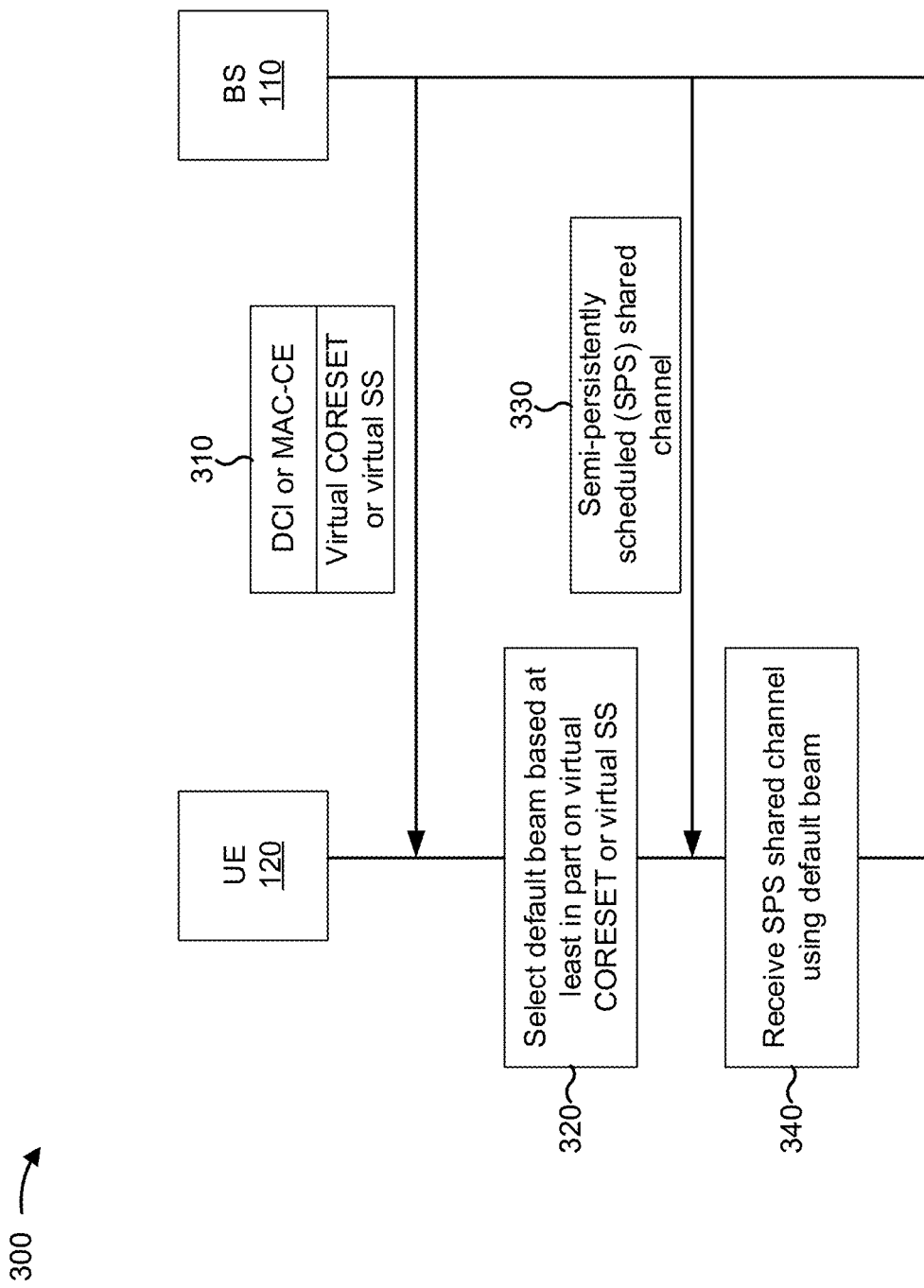
FIG. 3 is a diagram illustrating an example of dynamic reconfiguration of virtual search spaces and/or CORESETs, in accordance with various aspects of the present disclosure.

FIG. 3 is a diagram illustrating an example 300 of dynamic reconfiguration of virtual search spaces and/or CORESETs, in accordance with various aspects of the present disclosure. As shown, FIG. 3 includes a UE (e.g., UE 120) and a BS (e.g., BS 110).

As shown in FIG. 3, and by reference number 310, the BS may transmit configuration information identifying a virtual CORESET or a virtual search space. For example, the BS may transmit this information using DCI, a MAC-CE, and/or the like. The configuration information may include any information identifying or modifying a configuration for a virtual search space. For example, the UE and/or the BS may support a zero number of PDCCH candidates at least for virtual search space set configuration. The virtual search space set may be one type of search space set defined and used for PDSCH beam indication. In some cases, the BS may configure separate sets of search space sets. For example, a first set may include a number of virtual search space sets and a second set may include a number of normal search space sets. The number of normal search space sets per bandwidth part (BWP) may be limited in order to restrict the UE's blind decoding overhead. However, a virtual search space set configured by the BS may not increase an overhead of blind decoding for the UE, and the number of virtual search space sets may be much larger than the number of normal search space sets. In this case, it is particularly advantageous to use the lower-layer signaling, since each virtual search space set's configuration information may be associated with some latency. By providing the configuration information using lower-layer signaling, latency associated with default beam determination by the UE may be reduced.

As shown by reference number 320, the UE may select a default beam based at least in part on the virtual CORESET or the virtual search space indicated by the lower-layer signaling. For example, in a case when a scheduling offset (e.g., $k_0$) is less than a threshold, the UE may use a directional or beamformed beam (e.g., a default beam) based at least in part on the TCI state used for PDCCH QCL indication of the lowest CORESET-ID in a latest slot in which one or more CORESETs are configured for the UE (whether the lowest CORESET-ID is associated with a virtual CORESET or a normal CORESET). By indicating the configuration information using the lower-layer signaling, the UE can more quickly implement the configuration information, thereby enabling quicker reconfiguration of the virtual search space (and, therefore, improved UE performance with regard to receiving the semi-persistently scheduled shared channel).

As shown by reference number 330, the BS may transmit a semi-persistently scheduled shared channel. For example, the BS may transmit the semi-persistently scheduled shared channel based at least in part on the default beam. As shown by reference number 340, the UE may receive the semi-persistently scheduled shared channel using the default beam (e.g., using a TCI state and/or QCL assumption that is determined as described above). In some aspects, the UE may select the default beam for an uplink transmission in accordance with the lower-layer signaling of the virtual CORESET or virtual search space, and may perform the uplink transmission using the default beam. In other words, these techniques can be applied in the uplink as well as the downlink.

As indicated above, FIG. 3 is provided as an example. Other examples may differ from what is described with respect to FIG. 3.

Figure 4:
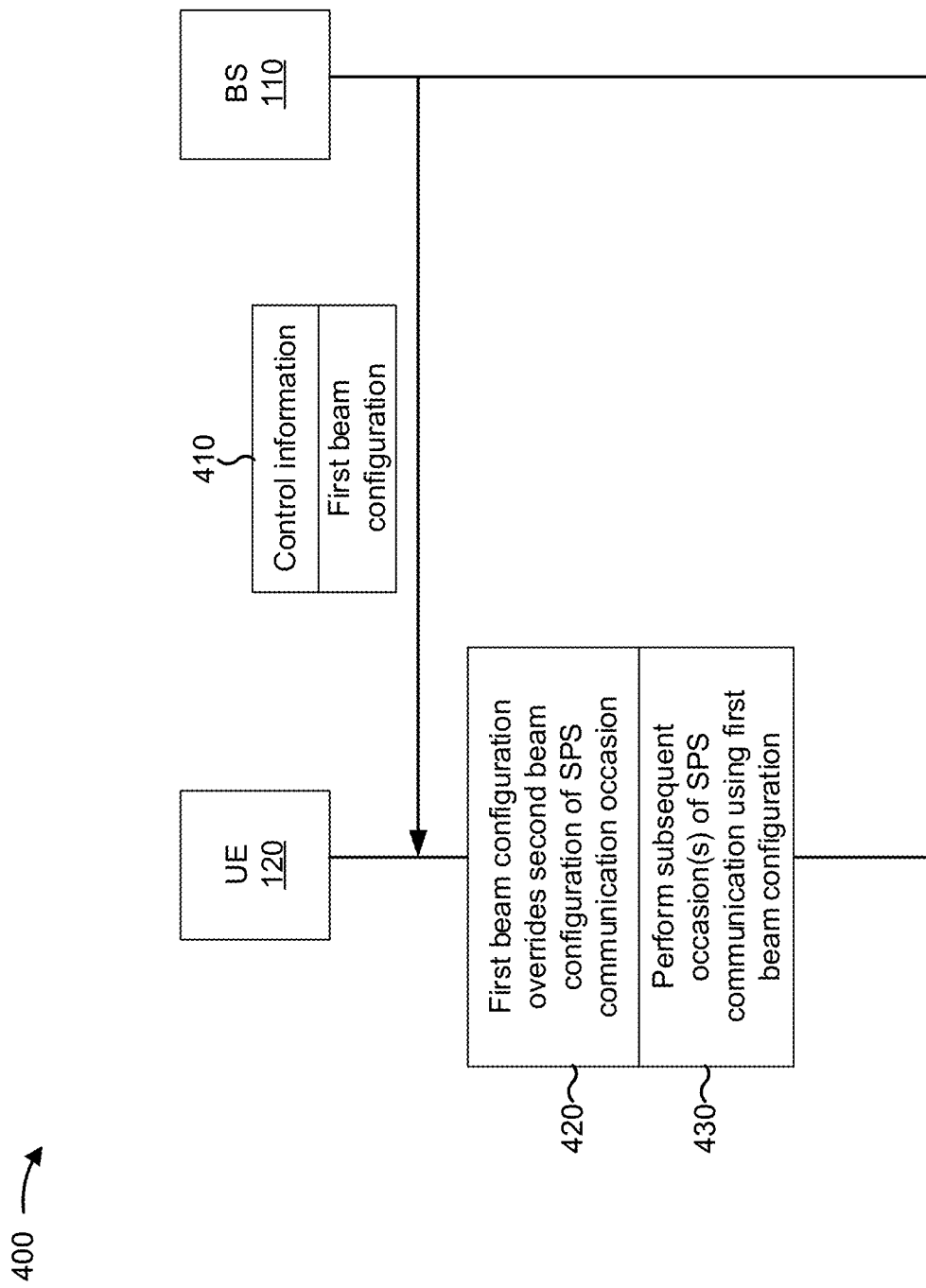
FIG. 4 is a diagram illustrating an example of a persistent approach for an overwritten beam indication, in accordance with various aspects of the present disclosure.

FIG. 4 is a diagram illustrating an example 400 of a persistent approach for an overwritten beam indication, in accordance with various aspects of the present disclosure. As shown, FIG. 4 includes a UE (e.g., UE 120) and a BS (e.g., BS 110).

As shown in FIG. 4, and by reference number 410, the BS may provide control information to the UE. The control information may identify a first beam configuration for an SPS communication occasion. The SPS communication may be associated with an SPS communication occasion, which may be an uplink transmission, a downlink transmission, a data transmission, a control transmission, and/or the like. The control information may include a PDCCH for a resource that at least partially overlaps the SPS communication occasion. Accordingly, the first beam configuration may override a second beam configuration of the SPS communication occasion. In this way, the BS may indicate an updated beam configuration for the SPS communication occasion. Herein, "first beam configuration" and "second beam configuration" are used to differentiate the respective beam configurations, and does not imply a temporal or hierarchical relationship between the respective beam configurations.

As shown by reference number 420, the first beam configuration may override the second beam configuration of the SPS communication occasion. For example, the UE may determine that the first beam configuration overrides the second beam configuration based at least in part on the resource associated with the first beam information at least partially overlapping (or completely overlapping) the SPS communication occasion.

As shown by reference number 430, the UE may perform one or more subsequent occasions of the SPS communication using the first beam configuration. For example, the UE may use the first beam configuration based at least in part on determining that the first beam configuration overrides the second beam configuration. In some aspects, the UE may reconfigure the SPS communication without deactivating or reactivating the SPS communication or without interrupting a pattern of the SPS communication. In some aspects, the UE may use the first beam configuration for the one or more subsequent occasions based at least in part on an indication that the UE is to use the first beam configuration for the one or more subsequent occasions.

In some aspects, the UE may perform the one or more subsequent occasions based at least in part on a window or a number of occasions for the first beam configuration to be used. For example, the indication may indicate the window or the number of occasions for the first beam configuration to be used. As examples, the UE may perform the one or more subsequent occasions to indicate a time window (e.g., use the first beam configuration for a next X ms), a number of semi-persistently scheduled communications (e.g., use the first beam configuration for a next X shared channels with a configured grant), and/or the like. In some aspects, the UE may perform the one or more subsequent occasions using the first beam configuration until the first beam configuration is overridden, or until the SPS communication is deactivated. The indication may be provided using RRC, a MAC-CE, DCI (e.g., the control information described in connection with reference number 410 or other control information), and/or the like.

As indicated above, FIG. 4 is provided as an example. Other examples may differ from what is described with respect to FIG. 4.

Figure 5:
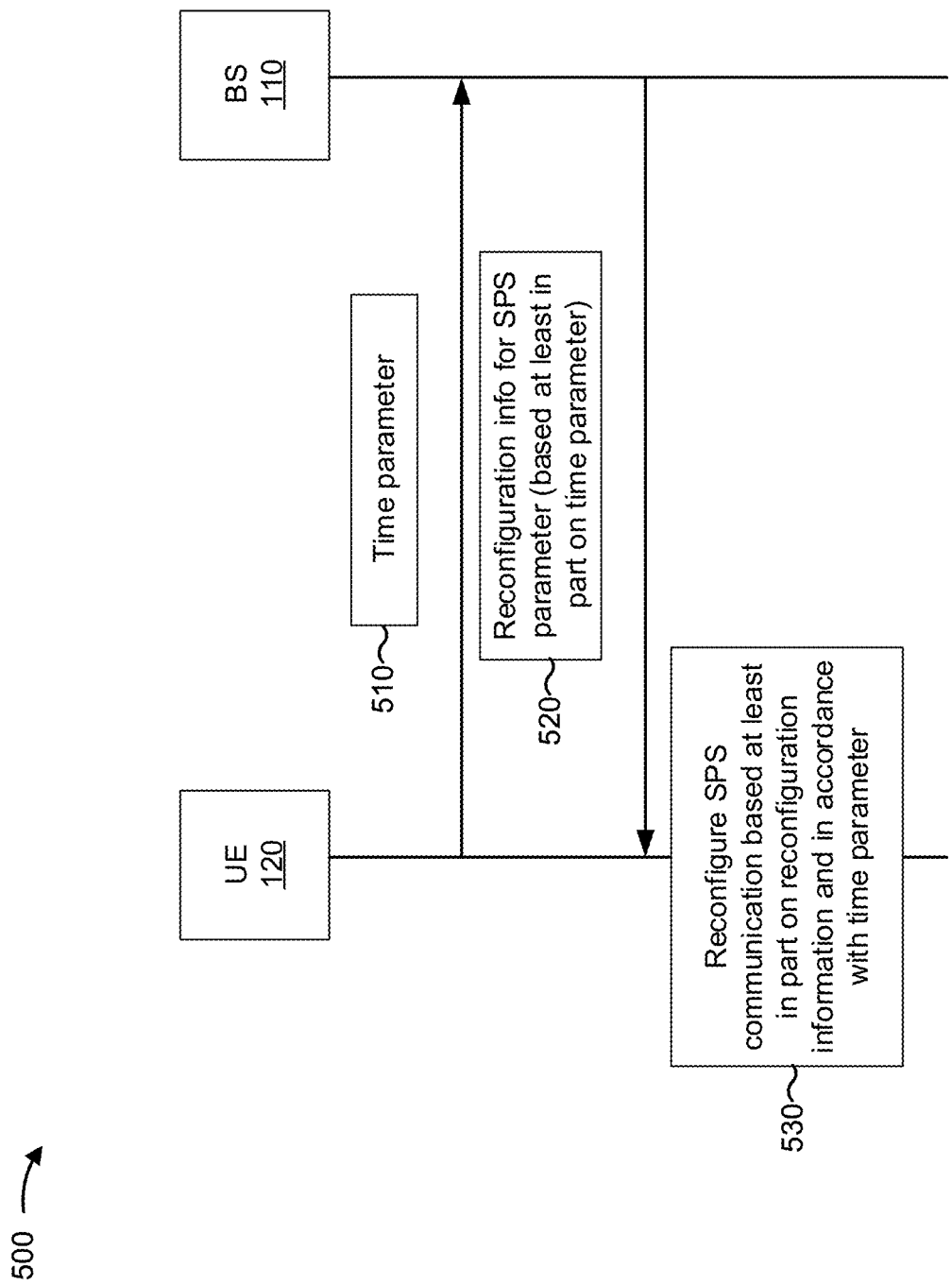
FIG. 5 is a diagram illustrating an example of reconfiguration of a semi-persistent scheduling (SPS) communication based at least in part on a time parameter, in accordance with various aspects of the present disclosure.

FIG. 5 is a diagram illustrating an example 500 of reconfiguration of an SPS communication based at least in part on a time parameter, in accordance with various aspects of the present disclosure. As shown, FIG. 5 includes a UE (e.g., UE 120) and a BS (e.g., BS 110).

As shown in FIG. 5, and by reference number 510, the UE may provide information indicating a time parameter to the BS. For example, the time parameter may relate to a time value associated with reconfiguring an SPS parameter of an SPS communication (e.g., a TCI state, a QCL parameter, other aspects of a beam configuration, and/or the like). For example, at a time indicated by the time parameter, the UE may be ready to use the SPS parameter as reconfigured. It should be noted that "SPS parameter," as used here, can refer to a parameter of an uplink configured grant, a downlink SPS communication, or another type of semi-persistently scheduled communication or shared channel. The BS may determine and/or provide reconfiguration information for the SPS parameter based at least in part on the time parameter. In some aspects, the UE may not provide the time parameter. For example, the BS may determine the time parameter, may be configured with the time parameter, and/or the like. As another example, the time parameter may be standardized. In some aspects, the UE may provide the time parameter using any suitable signaling, such as UE capability signaling and/or the like. Particular examples of time parameters are described in more detail below.

As shown by reference number 520, the BS may provide reconfiguration information for the SPS parameter. For example, the BS may provide the reconfiguration information using RRC signaling, a MAC-CE, DCI, and/or the like. In the case of DCI-based reconfiguration information, the UE may or may not provide an acknowledgment (ACK) or a negative ACK (NACK) for the reconfiguration information. The reconfiguration information may relate to one or more SPS parameters such as, for example, a modulation and coding scheme, a beam indication, a rank, and/or the like.

In some aspects, the time parameter may be specific to a particular SPS parameter. For example, the UE may be associated with a first time parameter associated with completion of a modulation and coding scheme reconfiguration, a second time parameter associated with completion of a rank reconfiguration, and/or the like. This may provide more granular control over the configuration of the reconfiguration information, thereby improving UE performance for semi-persistently scheduled communications. In some aspects, the time parameter may be common to (e.g., the same for) two or more SPS parameters, which may reduce signaling overhead.

In some aspects, the time parameter may identify a minimum time length after an ACK transmission for the reconfiguration information. For example, when the reconfiguration is signaled using a MAC-CE, the time parameter may identify a minimum time length after an ACK transmission for the MAC-CE. In some aspects, the time parameter may identify a minimum time length after an end of the reconfiguration information. For example, in the case of a DCI-based reconfiguration information without an ACK/NACK, the time parameter may identify a minimum time length after an end of the DCI. In some aspects, the time parameter may identify a minimum time length after an ACK/NACK. For example, in the case of a DCI-based reconfiguration information with an ACK/NACK, the time parameter may identify a minimum time length after an end of the ACK/NACK.

As shown by reference number 530, the UE may reconfigure the SPS communication based at least in part on the reconfiguration information and in accordance with the time parameter. For example, the UE may perform the SPS communication in accordance with the reconfiguration information. By taking into account the time parameter for the reconfiguration information, performance of the UE is improved and misconfiguration of the UE is reduced.

As indicated above, FIG. 5 is provided as an example. Other examples may differ from what is described with respect to FIG. 5.

Figure 6:
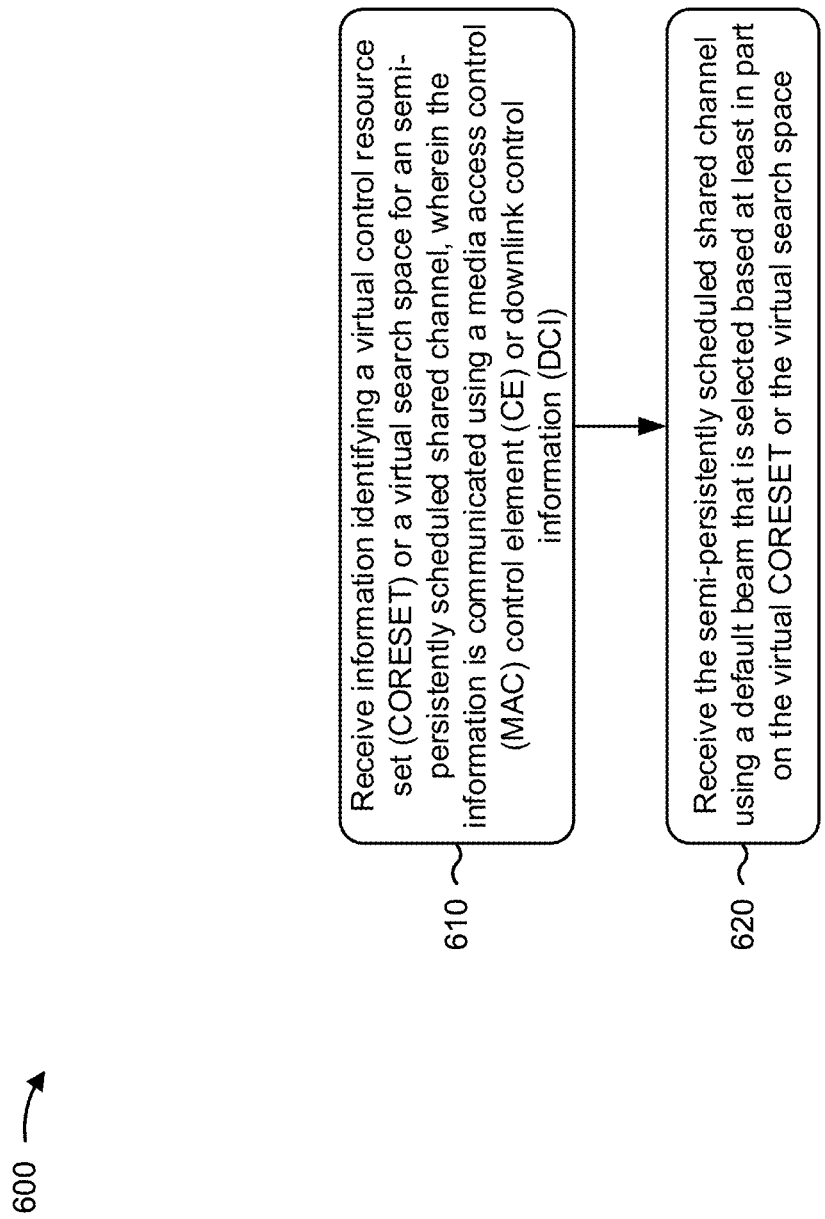
FIGS. 6-11 are diagrams illustrating example processes performed in accordance with various aspects of the present disclosure.

FIG. 6 is a diagram illustrating an example process 600 performed, for example, by a user equipment, in accordance with various aspects of the present disclosure. Example process 600 is an example where a user equipment (e.g., user equipment 120 and/or the like) performs operations associated with beam indication for semi-persistent transmissions.

As shown in FIG. 6, in some aspects, process 600 may include receiving information identifying a virtual CORESET or a virtual search space for a semi-persistently scheduled shared channel wherein the information is communicated using a MAC CE or DCI (block 610). For example, the user equipment (e.g., using antenna 252, DEMOD 254, MIMO detector 256, receive processor 258, controller/processor 280, and/or the like) may receive information identifying a virtual CORESET or a virtual search space for a semi-persistently scheduled shared channel. In some aspects, the information is communicated using a MAC CE or DCI.

As further shown in FIG. 6, in some aspects, process 600 may include receiving the semi-persistently scheduled shared channel using a default beam that is selected based at least in part on the virtual CORESET or the virtual search space (block 620). For example, the user equipment (e.g., using antenna 252, DEMOD 254, MIMO detector 256, receive processor 258, controller/processor 280, and/or the like) may receive the semi-persistently scheduled shared channel using a default beam that is selected based at least in part on the virtual CORESET or the virtual search space, as described above.

Process 600 may include additional aspects, such as any single implementation or any combination of aspects described below and/or in connection with one or more other processes described elsewhere herein.

In a first aspect, the information identifying the virtual CORESET or the virtual search space comprises reconfiguration information.

In a second aspect, alone or in combination with the first aspect, an initial configuration of the virtual CORESET or the virtual search space is communicated using radio resource control (RRC) information.

In a third aspect, alone or in combination with the first aspect and/or the second aspect, the information identifying the virtual CORESET or the virtual search space indicates a quasi-collocation assumption for the virtual CORESET or the virtual search space.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
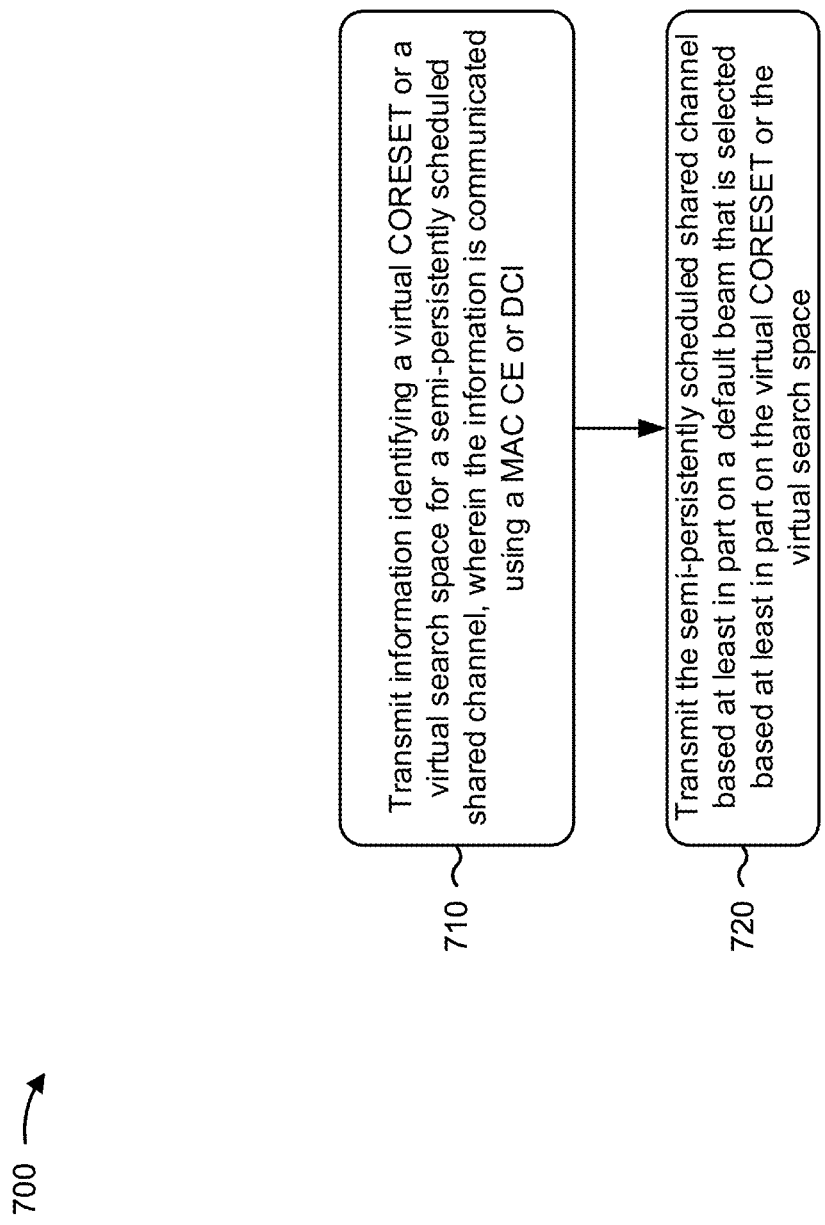

FIG. 7 is a diagram illustrating an example process 700 performed, for example, by a base station, in accordance with various aspects of the present disclosure. Example process 700 is an example where a base station (e.g., base station 110 and/or the like) performs operations associated with beam indication for semi-persistent transmissions.

As shown in FIG. 7, in some aspects, process 700 may include transmitting information identifying a virtual CORESET or a virtual search space for a semi-persistently scheduled shared channel wherein the information is communicated using a MAC CE or DCI (block 710). For example, the base station (e.g., using controller/processor 240, transmit processor 220, TX MIMO processor 230, MOD 232, antenna 234, and/or the like) may transmit information identifying a CORESET or a virtual search space for a semi-persistently scheduled shared channel, as described above. In some aspects, the information is communicated using a MAC CE or DCI.

As further shown in FIG. 7, in some aspects, process 700 may include transmitting the semi-persistently scheduled shared channel based at least in part on a default beam that is selected based at least in part on the virtual CORESET or the virtual search space (block 720). For example, the base station (e.g., using controller/processor 240, transmit processor 220, TX MIMO processor 230, MOD 232, antenna 234, and/or the like) may transmit the semi-persistently scheduled shared channel based at least in part on a default beam that is selected based at least in part on the virtual CORESET or the virtual search space, as described above.

Process 700 may include additional aspects, such as any single implementation or any combination of aspects described below and/or in connection with one or more other processes described elsewhere herein.

In a first aspect, the information identifying the virtual CORESET or the virtual search space comprises reconfiguration information.

In a second aspect, alone or in combination with the first aspect, an initial configuration of the virtual CORESET or the virtual search space is communicated using RRC information.

In a third aspect, alone or in combination with the first aspect and/or the second aspect, the information identifying the virtual CORESET or the virtual search space indicates a quasi-colocation assumption for the virtual CORESET or the virtual search space.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
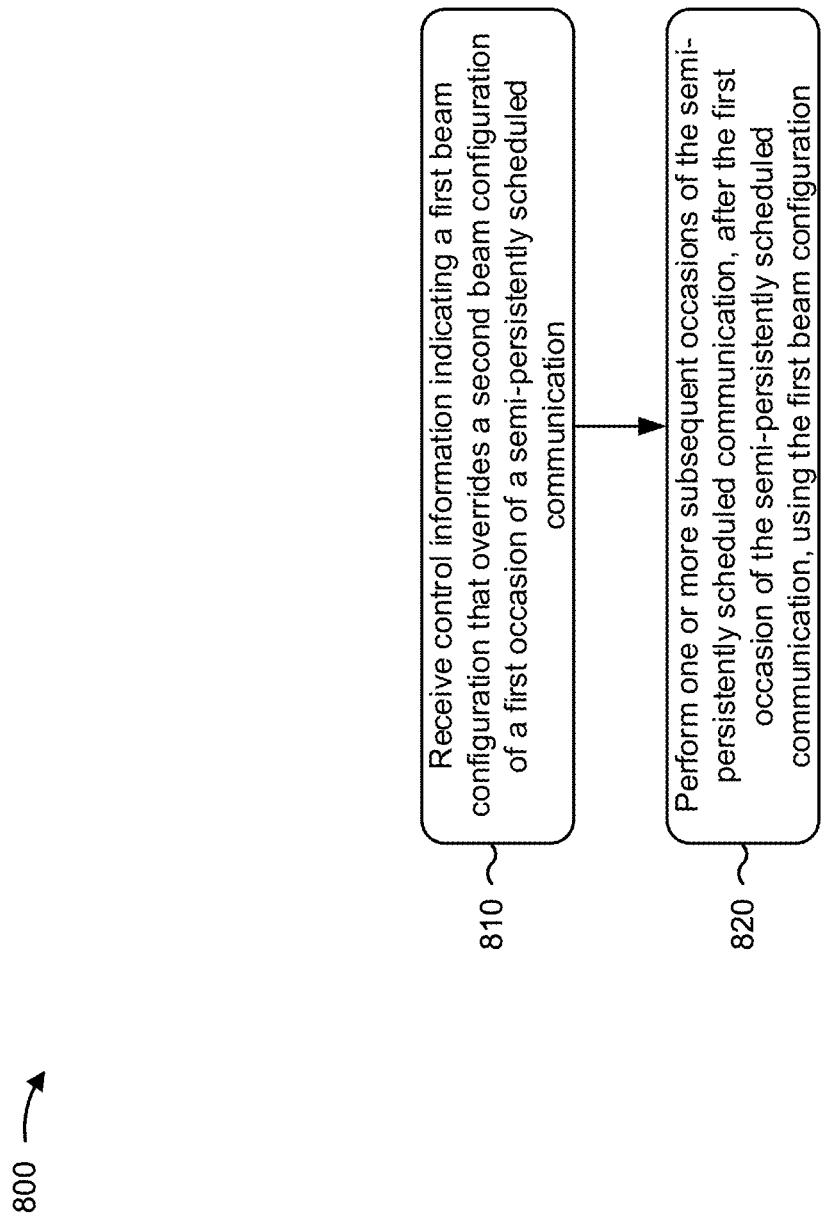

FIG. 8 is a diagram illustrating an example process 800 performed, for example, by a user equipment, in accordance with various aspects of the present disclosure. Example process 800 is an example where a user equipment (e.g., user equipment 120 and/or the like) performs operations associated with beam indication for semi-persistent transmissions.

As shown in FIG. 8, in some aspects, process 800 may include receiving control information indicating a first beam configuration that overrides a second beam configuration of a first occasion of an SPS communication (block 810). For example, the user equipment (e.g., using antenna 252, DEMOD 254, MIMO detector 256, receive processor 258, controller/processor 280, and/or the like) may receive control information indicating a first beam configuration that overrides a second beam configuration of a first occasion of an SPS communication, as described above.

As further shown in FIG. 8, in some aspects, process 800 may include performing one or more subsequent occasions of the SPS communication, after the first occasion of the SPS communication, using the first beam configuration (block 820). For example, the user equipment (e.g., using controller/processor 280, transmit processor 264, TX MIMO processor 266, MOD 254, antenna 252, and/or the like) may perform one or more subsequent occasions of the SPS communication, after the first occasion of the SPS communication, using the first beam configuration, as described above.

Process 800 may include additional aspects, such as any single implementation or any combination of aspects described below and/or in connection with one or more other processes described elsewhere herein.

In a first aspect, receiving one or more subsequent occasions of the SPS communication, after the first occasion of the SPS communication, using the first beam configuration further comprises receiving the one or more subsequent occasions of the SPS communication using the first beam configuration without receiving additional control information corresponding to the one or more subsequent occasions.

In a second aspect, alone or in combination with the first aspect, the SPS communication comprises an uplink data transmission or an uplink control transmission.

In a third aspect, alone or in combination with the first aspect and/or the second aspect, the SPS communication comprises a downlink data transmission or a downlink control transmission.

In a fourth aspect, alone or in combination with one or more of the first through third aspects, the user equipment may receive information that indicates that the first beam configuration is to be used for the one or more subsequent occasions or that indicates a parameter for using the first beam configuration for the one or more subsequent occasions.

In a fifth aspect, alone or in combination with one or more of the first through fourth aspects, the parameter indicates a time window in which the first beam configuration is to be used for the one or more subsequent occasions.

In a sixth aspect, alone or in combination with one or more of the first through fifth aspects, the parameter indicates a number of occasions for which the first beam configuration is to be used.

In a seventh aspect, alone or in combination with one or more of the first through sixth aspects, the parameter indicates a number of occasions of the SPS communication that are associated with a configured grant for which the first beam configuration is to be used.

In an eighth aspect, alone or in combination with one or more of the first through seventh aspects, the parameter indicates that the first beam configuration is to be used until overwritten.

In a ninth aspect, alone or in combination with one or more of the first through eighth aspects, the parameter indicates that the first beam configuration is to be used until the SPS communication is deactivated.

In a tenth aspect, alone or in combination with one or more of the first through ninth aspects, the information that indicates that the first beam configuration is to be used for the one or more subsequent occasions or that indicates a parameter for using the first beam configuration for the one or more subsequent occasions is communicated using an RRC message, a MAC CE, or DCI.

In an eleventh aspect, alone or in combination with one or more of the first through tenth aspects, the information that indicates that the first beam configuration is to be used for the one or more subsequent occasions, or that indicates a parameter for using the first beam configuration for the one or more subsequent occasions, is communicated in connection with the control information.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
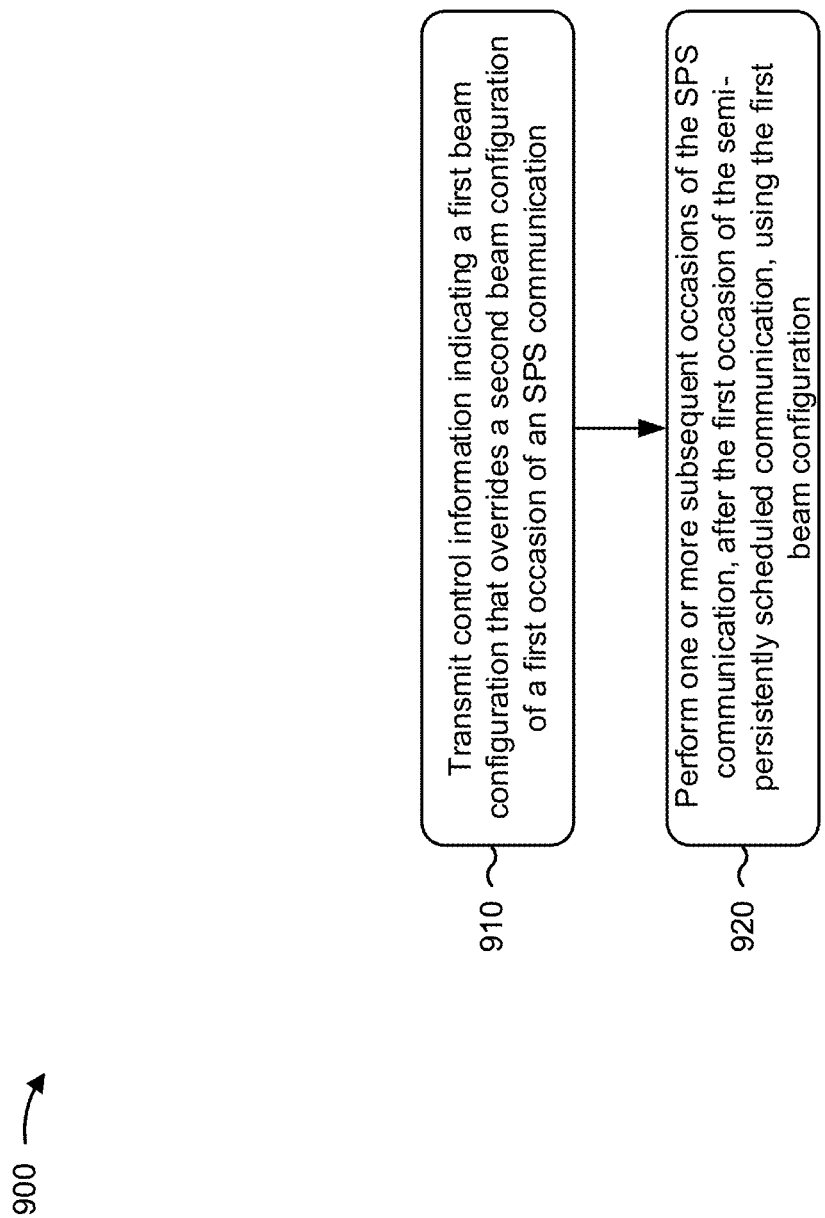

FIG. 9 is a diagram illustrating an example process 900 performed, for example, by a base station, in accordance with various aspects of the present disclosure. Example process 900 is an example where a base station (e.g., base station 110 and/or the like) performs operations associated with beam indication for semi-persistent transmissions.

As shown in FIG. 9, in some aspects, process 900 may include transmitting control information indicating a first beam configuration that overrides a second beam configuration of a first occasion of an SPS communication (block 910). For example, the base station (e.g., using transmit processor 220, receive processor 238, controller/processor 240, memory 242, and/or the like) may transmit control information indicating a first beam configuration that overrides a second beam configuration of a first occasion of an SPS communication, as described above.

As further shown in FIG. 9, in some aspects, process 900 may include performing one or more subsequent occasions of the SPS communication, after the first occasion of the SPS communication, using the first beam configuration (block 920). For example, the base station (e.g., using transmit processor 220, receive processor 238, controller/processor 240, memory 242, and/or the like) may perform one or more subsequent occasions of the SPS communication, after the first occasion of the SPS communication, using the first beam configuration, as described above.

Process 900 may include additional aspects, such as any single implementation or any combination of aspects described below and/or in connection with one or more other processes described elsewhere herein.

In a first aspect, transmitting one or more subsequent occasions of the SPS communication, after the first occasion of the SPS communication, using the first beam configuration further comprises transmitting the one or more subsequent occasions of the SPS communication using the first beam configuration without receiving additional control information corresponding to the one or more subsequent occasions.

In a second aspect, alone or in combination with the first aspect, the SPS communication comprises an uplink data transmission or an uplink control transmission.

In a third aspect, alone or in combination with the first aspect and/or the second aspect, the SPS communication comprises a downlink data transmission or a downlink control transmission.

In a fourth aspect, alone or in combination with one or more of the first through third aspects, the base station may transmit information that indicates that the first beam configuration is to be used for the one or more subsequent occasions or that indicates a parameter for using the first beam configuration for the one or more subsequent occasions.

In a fifth aspect, alone or in combination with one or more of the first through fourth aspects, the parameter indicates a time window in which the first beam configuration is to be used for the one or more subsequent occasions.

In a sixth aspect, alone or in combination with one or more of the first through fifth aspects, the parameter indicates a number of occasions for which the first beam configuration is to be used.

In a seventh aspect, alone or in combination with one or more of the first through sixth aspects, the parameter indicates a number of occasions of the SPS communication that are associated with a configured grant for which the first beam configuration is to be used.

In an eighth aspect, alone or in combination with one or more of the first through seventh aspects, the parameter indicates that the first beam configuration is to be used until overwritten.

In a ninth aspect, alone or in combination with one or more of the first through eighth aspects, the parameter indicates that the first beam configuration is to be used until the SPS communication is deactivated.

In a tenth aspect, alone or in combination with one or more of the first through ninth aspects, the information that indicates that the first beam configuration is to be used for the one or more subsequent occasions or that indicates a parameter for using the first beam configuration for the one or more subsequent occasions is communicated using an RRC message, a MAC CE, or DCI.

In an eleventh aspect, alone or in combination with one or more of the first through tenth aspects, the information that indicates that the first beam configuration is to be used for the one or more subsequent occasions, or that indicates a parameter for using the first beam configuration for the one or more subsequent occasions, is communicated in connection with the control information.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
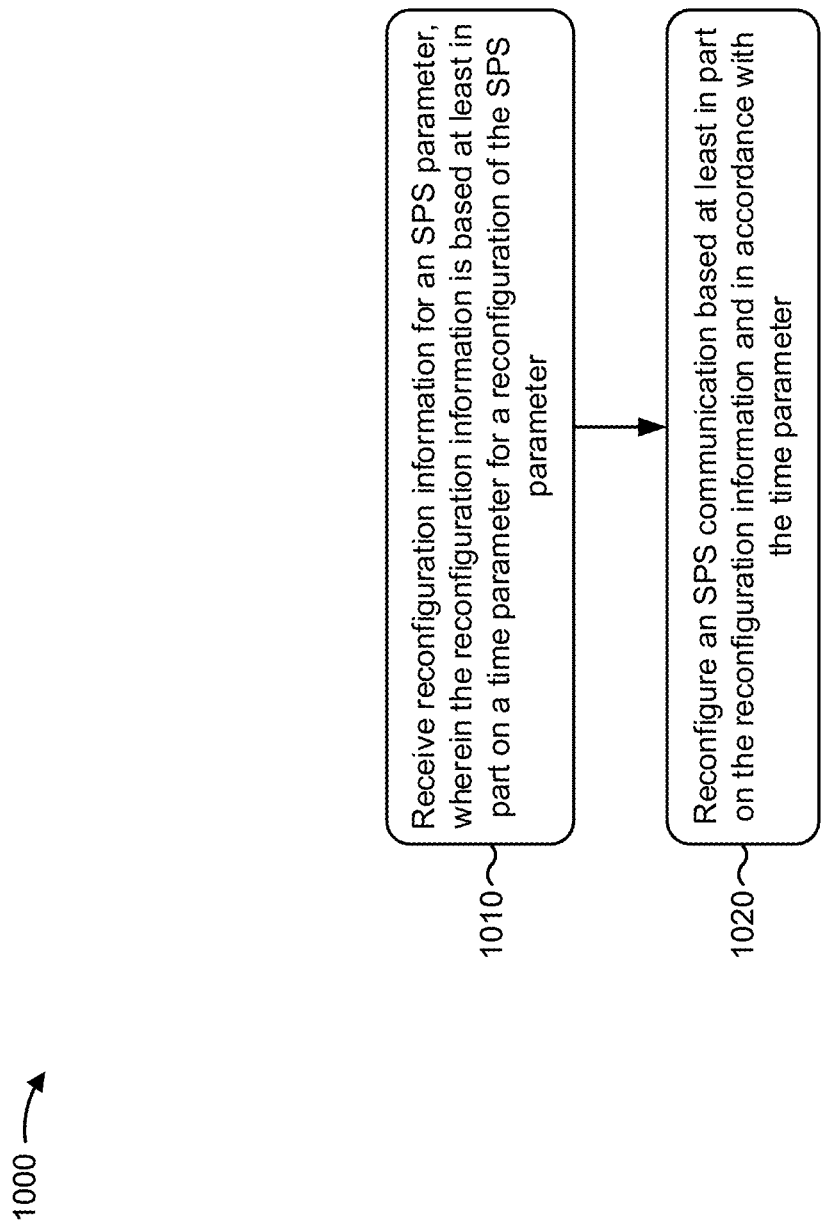

FIG. 10 is a diagram illustrating an example process 1000 performed, for example, by a user equipment, in accordance with various aspects of the present disclosure. Example process 1000 is an example where a user equipment (e.g., user equipment 120 and/or the like) performs operations associated with beam indication for semi-persistent transmissions.

As shown in FIG. 10, in some aspects, process 1000 may include receiving reconfiguration information for an SPS parameter, wherein the reconfiguration information is based at least in part on a time parameter associated with completion of a reconfiguration of the SPS parameter (block 1010). For example, the user equipment (e.g., using receive processor 258, transmit processor 264, controller/processor 280, memory 282, and/or the like) may receive reconfiguration information for an SPS parameter, as described above. In some aspects, the reconfiguration information is based at least in part on a time parameter associated with completion of a reconfiguration of the SPS parameter.

As further shown in FIG. 10, in some aspects, process 1000 may include reconfiguring an SPS communication based at least in part on the reconfiguration information and in accordance with the time parameter (block 1020). For example, the user equipment (e.g., using receive processor 258, transmit processor 264, controller/processor 280, memory 282, and/or the like) may reconfigure an SPS communication based at least in part on the reconfiguration information and in accordance with the time parameter, as described above.

Process 1000 may include additional aspects, such as any single implementation or any combination of aspects described below and/or in connection with one or more other processes described elsewhere herein.

In a first aspect, reconfiguring the SPS communication further comprises reconfiguring the SPS communication without deactivating or reactivating the SPS communication or without interrupting a pattern of the SPS communication.

In a second aspect, alone or in combination with the first aspect, the reconfiguration information is communicated using at least one of RRC messaging, a MAC CE, or DCI.

In a third aspect, alone or in combination with one or more of the first and second aspects, the user equipment may transmit an acknowledgment (ACK) or a negative ACK (NACK) for the reconfiguration information.

In a fourth aspect, alone or in combination with one or more of the first through third aspects, the reconfiguration information is not associated with an acknowledgment (ACK) or a negative ACK (NACK).

In a fifth aspect, alone or in combination with one or more of the first through fourth aspects, the time parameter indicates a length of time after an acknowledgment transmission for the reconfiguration information.

In a sixth aspect, alone or in combination with one or more of the first through fifth aspects, the time parameter indicates a length of time or a number of symbols after an end of receiving the reconfiguration information.

In a seventh aspect, alone or in combination with one or more of the first through sixth aspects, the time parameter indicates a length of time or a number of symbols after an end of an acknowledgment or a negative.

In an eighth aspect, alone or in combination with one or more of the first through seventh aspects, the time parameter comprises multiple time parameters for respective SPS parameters.

In a ninth aspect, alone or in combination with one or more of the first through eighth aspects, the SPS parameter comprises at least one of a modulation and coding scheme, a beam indication, or a rank.

In a tenth aspect, alone or in combination with one or more of the first through ninth aspects, the information indicating the time parameter is transmitted by the UE as a UE capability.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
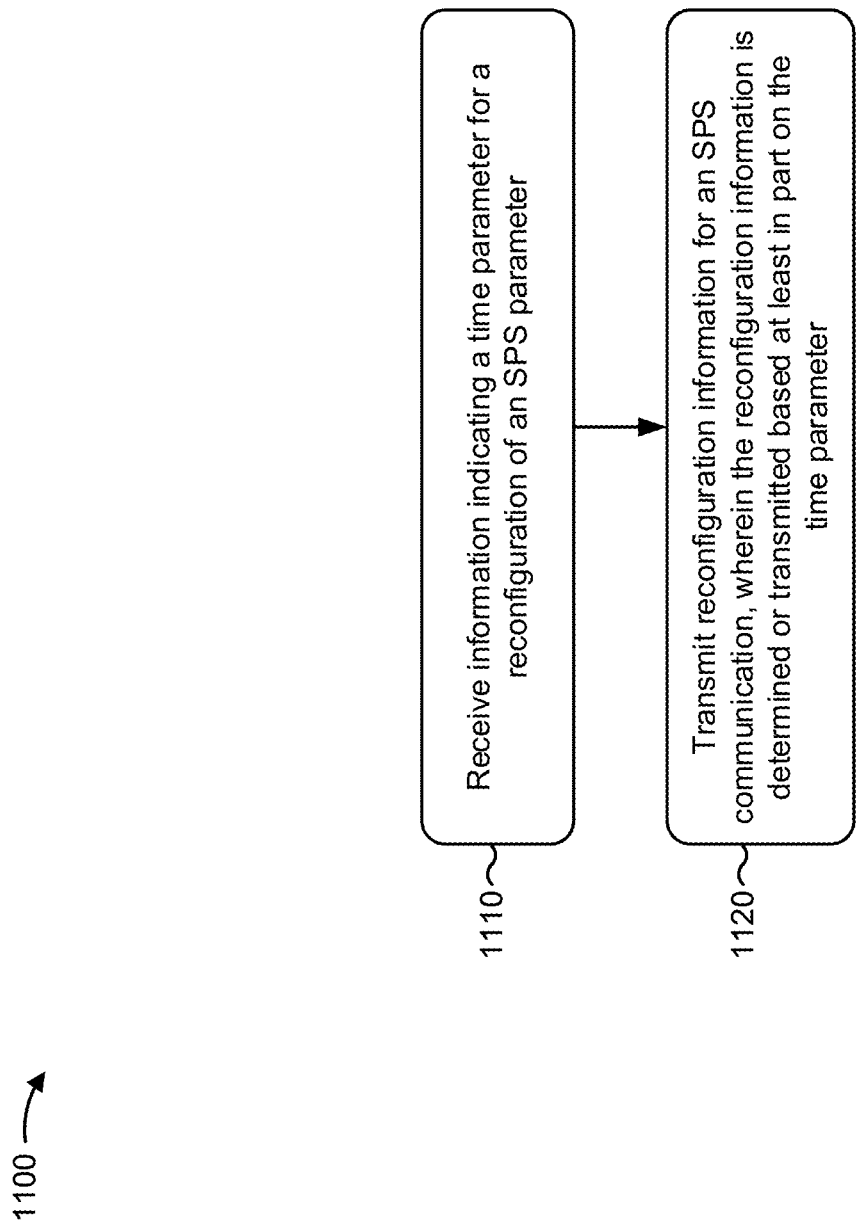

FIG. 11 is a diagram illustrating an example process 1100 performed, for example, by a base station, in accordance with various aspects of the present disclosure. Example process 1100 is an example where a base station (e.g., base station 110 and/or the like) performs operations associated with beam indication for semi-persistent transmissions.

As shown in FIG. 11, in some aspects, process 1100 may include receiving information indicating a time parameter associated with completion of a reconfiguration of an SPS parameter (block 1110). For example, the base station (e.g., using transmit processor 220, receive processor 238, controller/processor 240, memory 242, and/or the like) may receive information indicating a time parameter associated with completion of a reconfiguration of an SPS parameter, as described above.

As further shown in FIG. 11, in some aspects, process 1100 may include transmitting reconfiguration information for an SPS communication, wherein the reconfiguration information is determined or transmitted based at least in part on the time parameter (block 1120). For example, the base station (e.g., using transmit processor 220, receive processor 238, controller/processor 240, memory 242, and/or the like) may transmit reconfiguration information for an SPS communication, as described above. In some aspects, the reconfiguration information is determined or transmitted based at least in part on the time parameter.

Process 1100 may include additional aspects, such as any single implementation or any combination of aspects described below and/or in connection with one or more other processes described elsewhere herein.

In a first aspect, the reconfiguration information is transmitted using at least one of RRC messaging, a MAC CE, or DCI.

In a second aspect, alone or in combination with the first aspect, the base station may receive an ACK or a NACK for the reconfiguration information.

In a third aspect, alone or in combination with one or more of the first and second aspects, the time parameter indicates a length of time after an acknowledgment transmission for the reconfiguration information.

In a fourth aspect, alone or in combination with one or more of the first through third aspects, the time parameter indicates a length of time or a number of symbols after an end of receiving the reconfiguration information.

In a fifth aspect, alone or in combination with one or more of the first through fourth aspects, the time parameter indicates a length of time or a number of symbols after an end of an acknowledgment or a negative acknowledgment.

In a sixth aspect, alone or in combination with one or more of the first through fifth aspects, the time parameter comprises multiple time parameters for respective SPS parameters.

In a seventh aspect, alone or in combination with one or more of the first through sixth aspects, the SPS parameter comprises at least one of a modulation and coding scheme, a beam indication, or a rank.

In an eighth aspect, alone or in combination with one or more of the first through seventh aspects, the information indicating the time parameter is received as a UE capability.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving information identifying a virtual search space for a semi-persistent scheduling (SPS) shared channel, wherein the information is communicated using a media access control (MAC) control element (CE) or downlink control information (DCI), and wherein the UE supports a zero number of physical downlink control channel candidates for a virtual search space set configuration;
   transmitting, based at least in part on receiving the information identifying the virtual search space, a time parameter associated with the virtual search space; and
   receiving semi-persistently scheduled shared channel using a default beam, that is selected by the UE based at least in part on the virtual search space, after a time associated with the time parameter.

2. The method of claim 1, wherein the information identifying the virtual search space comprises reconfiguration information.

3. The method of claim 1, wherein the information identifying the virtual search space indicates a quasi-collocation assumption for the virtual search space.

4. A method of wireless communication performed by a user equipment (UE), comprising:
   receiving control information indicating a first beam configuration that overrides a second beam configuration of a first occasion of a semi-persistent scheduling (SPS) communication;
   transmitting, based at least in part on receiving the control information, a time parameter, indicating a minimum length of time or a minimum number of symbols after the UE transmits an acknowledgement (ACK) or negative ACK (NACK), for using the first beam configuration for one or more subsequent occasions of the SPS communication; and
   performing the one or more subsequent occasions of the SPS communication, after the first occasion of the SPS communication, using the first beam configuration based at least in part on one or more parameters including the time parameter.

5. The method of claim 4, wherein performing the one or more subsequent occasions of the SPS communication, after the first occasion of the SPS communication, using the first beam configuration further comprises:
   receiving the one or more subsequent occasions of the SPS communication using the first beam configuration, based at least in part on the time parameter, without receiving additional control information corresponding to the one or more subsequent occasions.

6. The method of claim 4, wherein the SPS communication comprises at least one of an uplink data transmission, an uplink control transmission, a downlink data transmission, or a downlink control transmission.

7. The method of claim 4, further comprising:
   receiving information that indicates a second parameter, of the one or more parameters, for using the first beam configuration for the one or more subsequent occasions.

8. The method of claim 7, wherein the second parameter indicates a time window in which the first beam configuration is to be used for the one or more subsequent occasions.

9. The method of claim 7, wherein the second parameter indicates a number of occasions for which the first beam configuration is to be used.

10. The method of claim 7, wherein the second parameter indicates a number of occasions of the SPS communication that are associated with a configured grant for which the first beam configuration is to be used.

11. The method of claim 7, wherein the second parameter indicates that the first beam configuration is to be used until overwritten.

12. The method of claim 7, wherein the second parameter indicates that the first beam configuration is to be used until the SPS communication is deactivated.

13. The method of claim 7, wherein the information that indicates that the second parameter for using the first beam configuration for the one or more subsequent occasions is communicated in connection with the control information.

14. The method of claim 1, wherein the time parameter is specific to a particular type of SPS parameter.

15. A method of wireless communication performed by a network node, comprising:
   transmitting control information indicating a first beam configuration that overrides a second beam configuration of a first occasion of a semi-persistent scheduling (SPS) communication;
   receiving, based at least in part on transmitting the control information, a time parameter, indicating a minimum length of time or a minimum number of symbols after a user equipment (UE) transmits an acknowledgement (ACK) or negative ACK (NACK), for using the first beam configuration for one or more subsequent occasions of the SPS communication; and
   performing the one or more subsequent occasions of the SPS communication, after the first occasion of the SPS communication, using the first beam configuration, based at least in part on one or more parameters including the time parameter.

16. The method of claim 15, wherein performing the one or more subsequent occasions of the SPS communication, after the first occasion of the SPS communication, using the first beam configuration further comprises:
- transmitting the one or more subsequent occasions of the SPS communication using the first beam configuration without receiving additional control information corresponding to the one or more subsequent occasions.

17. The method of claim 15, further comprising:
- transmitting information that indicates a second parameter, of the one or more parameters, for using the first beam configuration for the one or more subsequent occasions.

18. The method of claim 17, wherein the second parameter indicates a time window in which the first beam configuration is to be used for the one or more subsequent occasions.

19. The method of claim 17, wherein the second parameter indicates a number of occasions for which the first beam configuration is to be used.

20. The method of claim 17, wherein the second parameter indicates a number of occasions of the SPS communication that are associated with a configured grant for which the first beam configuration is to be used.

21. The method of claim 17, wherein the second parameter indicates that the first beam configuration is to be used until overwritten.

22. The method of claim 17, wherein the information that indicates that the second parameter for using the first beam configuration for the one or more subsequent occasions is communicated in connection with the control information.

23. A method of wireless communication performed by a user equipment (UE), comprising:
- receiving reconfiguration information for a semi-persistent scheduling (SPS) parameter, wherein the reconfiguration information is based at least in part on one or more parameters including a time parameter, transmitted by the UE and indicating a minimum length of time or a minimum number of symbols after the UE transmits an acknowledgement (ACK) or negative ACK (NACK), for using the SPS parameter as reconfigured; and
- performing the reconfiguration of a SPS communication based at least in part on the reconfiguration information and in accordance with the time parameter.

24. The method of claim 23, wherein performing the reconfiguration of the SPS communication further comprises:
- performing the reconfiguration of the SPS communication without deactivating or reactivating the SPS communication or without interrupting a pattern of the SPS communication.

25. The method of claim 23, further comprising:
- transmitting the ACK or the NACK for the reconfiguration information.

26. The method of claim 23, wherein the time parameter indicates the minimum length of time or the minimum number of symbols after the ACK for the reconfiguration.

27. The method of claim 23, wherein the time parameter indicates the minimum length of time or the minimum number of symbols after an end of the ACK or a negative acknowledgment (NACK).

28. The method of claim 23, wherein the time parameter comprises multiple time parameters for respective SPS parameters.

29. The method of claim 23, wherein the SPS parameter comprises at least one of:
- a modulation and coding scheme,
- a beam indication, or
- a rank.

30. The method of claim 23, wherein the time parameter is specific to a particular type of SPS parameter.

* * * * *